United States Patent [19]

Ishikawa et al.

[11] 4,188,073
[45] Feb. 12, 1980

[54] ANTI-VIBRATION APPARATUS FOR A VEHICLE BRAKE SYSTEM

[75] Inventors: Masakazu Ishikawa; Juichi Shibatani; Sadayoshi Ito, all of Toyota, Japan

[73] Assignee: Toyota Jidosha Kogyo Kabushiki Kaisha, Aichi, Japan

[21] Appl. No.: 922,237

[22] Filed: Jul. 5, 1978

[30] Foreign Application Priority Data

Jan. 19, 1978 [JP] Japan ................. 53-4996

[51] Int. Cl.² ........................... B60T 17/04
[52] U.S. Cl. ..................... 303/87; 188/1 B; 303/6 C
[58] Field of Search .......... 138/26; 188/1 B; 303/6 C, 87

[56] References Cited

U.S. PATENT DOCUMENTS

| 3,430,660 | 3/1969 | Mitton ................. | 138/30 |
| 3,757,825 | 9/1973 | Givens et al. ........... | 303/87 |

FOREIGN PATENT DOCUMENTS 2340317 2/1975 Fed. Rep. of Germany.
908174 8/1945 France.
1040403 8/1966 United Kingdom ................. 303/87
1456274 12/1976 United Kingdom.

Primary Examiner—Duane A. Reger
Attorney, Agent, or Firm—Browdy and Neimark

[57] ABSTRACT

An anti-vibration apparatus for an automotive hydraulic braking system for preventing the brake vibration by means of imparting the function of absorbing the pulsation of the hydraulic braking fluid pressure to any one structural member of the braking system, which is disposed in the hydraulic, braking fluid circuit, with respective proper object, such as a three-way joint, a pressure control valve, a wheel cylinder, etc. This apparatus is constructed in communication with the fluid passage within the respective structural member and comprises a cylinder formed integrally with the structural member body, a plunger slidably and fluid-tightly fitted in the cylinder, one end thereof being under the pressure of the hydraulic braking fluid and the other end thereof being faced to an air chamber, a stopper for restricting the axial sliding of the plunger within a limited range, and a spring for constantly biasing the plunger against the hydraulic braking fluid pressure.

3 Claims, 6 Drawing Figures

4,188,073

ANTI-VIBRATION APPARATUS FOR A VEHICLE BRAKE SYSTEM

DETAILED DESCRIPTION OF THE INVENTION

The present invention relates to an anti-vibration means or an apparatus for an automotive hydraulic brake.

In a vehicle including a hydraulic brake system, uneven thickness of the disc rotor, insufficient cylindricity of the brake drum, etc. have been said to cause vibrations in the car body or the steering system, in some cases, and to cause, in some other cases, tremble or pulsation on the brake pedal. These phenomena are generally named brake vibration and theoretically attributed to a brake torque irregularity caused by pulsation of hydraulic pressure in the wheel cylinders, which is retroactively caused by vibration in the brake pad assembly, brake shoes, etc., coming from the uneven thickness of the disc rotor or insufficient cylindricity of the brake drum.

Most improvements conventionally attempted were aimed at the precision enhancement of individual members such as a disc rotor, a brake drum, etc., or at the seeking of better assemblying to avoid assemblying errors as much as possible. This way of thinking has inevitably raised the manufacturing or assemblying cost. As a matter of fact, the improvement in the machining precision of the individual members and the assemblying precision seems to be nearing the utmost limit. This invention has been made from such a background.

It is therefore a primary object of this invention to prevent occurring of brake vibration in an automotive hydraulic brake system.

It is another object of this invention to provide means or apparatus which is capable of achieving the above object while holding down the manufacturing and assemblying cost of the questioned brake system.

The basic technological idea of this invention resides in additionally imparting a vibration absorbing function to any one or more of the individual members of the hydraulic braking system, such as pipe joints, fluid control valves, wheel cylinders, pistons, etc., arranged respectively within the hydraulic braking fluid circuit with respective proper object. Furthermore, imparting such a function of pulsation absorbing to a member or members which are located as nearly as possible to the source of pulsation is another gist of this invention.

Preferred embodiments will be described hereunder with reference to the accompanied drawings in which.

Figure 1:
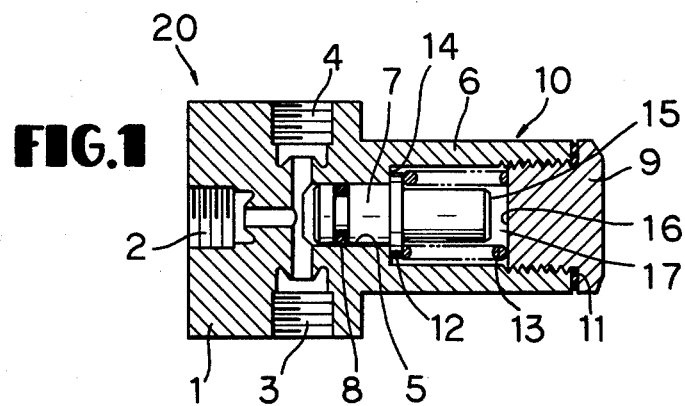
FIG. 1 is an elevational cross-section of an embodiment of a three-way joint according to this invention.

FIG. 1 shows an example in which the vibration absorbing means is incorporated in a three-way joint, the main body 1 of which has three mutually communicated ports 2, 3, and 4. A cylinder 6 having a stepped bore 5 is integrally formed with the main body 1. In this stepped bore 5 is fitted a plunger 7, which is provided with an O ring 8 for keeping the fluid tightness with the cylinder 6. At the open end of the cylinder 6 a plug 9 is threaded in for forming an isolated air chamber 17 separated from the atmosphere. Between the cylinder 6 and the plug 9 is disposed a gasket 11 lest the braking fluid should leak out, when the O ring be damaged by chance. A compression spring is mounted between the flange portion 12, formed at an intermediate portion of the plunger 7, and the inner end surface 16 of the plug 9 for biasing the plunger 7, at its flange 12, to constantly contact with the shoulder surface 14 of the stepped bore 5. So the end surface 15 of the plunger 7 facing the air chamber 17 is confronted with the inner surface 16 of the plug 9 with a predetermined distance or a space. The above-mentioned stepped portion or shoulder 14 of the cylinder 6, the flange 12, and the plug 9 constitute restricting means for restricting the movement of the plunger 7 within a certain limit. The questioned pulsation of the braking fluid is liable to take place within a specific range or sphere of the hydraulic braking pressure. The pressure ranges are somewhat different or varied according to the species and types of the brake, which necessitates to vary the set load of the compression spring 13 for complying with the situation of the brake system. The distance between the plunger 7 and the plug 9 is an allowance or play given to the plunger 7 for freely moving to and from the plug 9. This distance is also to be determined according to the sphere of the hydraulic braking pressure within which the pulsation is likely to occur. Actually it is a very small distance, and the absolute amount of increased braking fluid due to the incorporation of the pulsation absorber 10 is negligibly small, being within the range of 0.2–0.5 cc.

Figure 2:
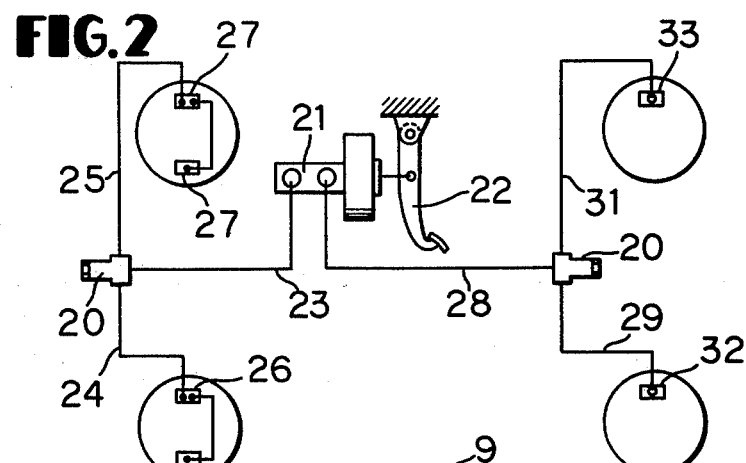
FIG. 2 is a schematical diagram of a hydraulic brake system incorporating the three-way joint shown in FIG. 1.

A hydraulic braking system which incorporates the above-described three-way joint 20 is schematically illustrated in FIG. 2. A master cylinder 21, having a pair of mutually independent pressure generating chambers, generates hydraulic braking pressure, in proportion to the depressing force on the brake pedal 22, in each thereof. The hydraulic braking pressure generated in one of the pressure generating chambers is delivered through the piping 23, and after having been divided into two by the three-way joint 20, passing through the piping 24, 25 further delivered to a pair of wheel cylinders 26, 27 mounted on the drum brake of both front wheels. The hydraulic fluid pressure in the other pressure generating chamber is similarly delivered, via piping 28, three-way joint 20, piping 29 and 31, to the wheel cylinders 32 and 33 of the drum brake mounted on both rear wheels.

In a hydraulic brake system having such a construction, if the cylindricity of the brake drum is insufficient, the brake shoes urging on it will repeat expansion and contraction following the irregular configuration of the brake drum. This irregular movement of the brake shoes will be transformed to that of the pistons; the contraction of the shoes will cause the deeper stroke of the pistons into the wheel cylinders 26, which in turn brings about a rise of the fluid pressure within the wheel cylinders 26, and the piping 24. In this embodiment, however, the three-way joint 20 will mitigate or absorb the pressure rise, because the plunger 7 will be pushed back by the pressure rise, resisting the spring force of the compression spring 13, toward the air chamber 17. On the other hand, when the brake shoes are expanded the pistons will be extruded the more out of the cylinders 26, which in turn lowers the fluid pressure accordingly within the wheel cylinders 26 and the piping 24. This pressure decrease will break the balance of power on the plunger 7 to restore the same to the original position under the spring force of the compression spring 13, which also mitigates the fall of the pressure. In other words, the variation of the fluid pressure due to the insufficient cylindricity of the brake drum can be mostly absorbed by the reciprocal movement of the plunger 7 in the cylinder 6, which effectively prevents taking place of the brake vibration. The above-mentioned explanation will entirely hold true in case of pressure variation due to the uneven thickness of the disc rotor.

In this embodiment, as the three-way joint 20 itself serves to absorb the pulsation, there is not required whatsoever special means or arrangement for leading the fluid pressure to the plunger 7 to be disposed, such as piping, joint, etc. This idea results in (1) simplification of the brake system construction; (2) simplification of assemblying process of the same; and (3) reducing the manufacturing cost. As other non-negligible advantages of this embodiment the following must be stressed: (1) it is located relatively near the source of vibration requiring a comparatively short pipe laying out, which short length of piping being greatly effective in absorbing the pulsation of the brake fluid; and (2) it is usually located favorably to be allowed occupying a relatively ample space, which facilitates the installation of the same.

Figure 3:
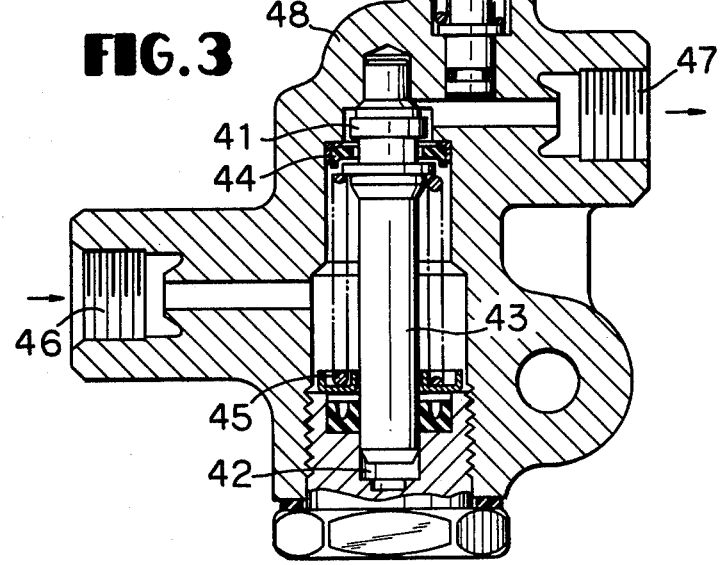
FIG. 3 is an elevational cross-section of a second embodiment in which the vibration absorbing means is disposed in combination with a proportioning valve.

FIG. 3 shows a second embodiment; the essential concept of this type lies in additionally imparting to a proportioning valve, a kind of braking pressure controlling valve, function as a pulsation absorber. In a word, a proportioning valve of prior art construction is newly added a function of pulsation absorbing on it. A proportioning valve portion in the figure is provided with a port 46, for intaking the fluid, another port 47, for discharging the fluid, a piston 43, which is provided with a valve 41 on one end thereof and faced on the other end thereof to an air chamber 42, and a compression spring 45 which constantly biases the piston 43 in the direction of separating the valve 41 from a valve seat 44. The function of this proportioning valve, as well known as a prior art, lies in controlling the output pressure at the discharging port 47, which is lead to the wheel cylinders lower in the rate of rising than the hydraulic pressure from the master cylinder, when the master cylinder pressure exceeds a certain preset limit. It needs no further detailed description because of its universal knowledge. On the housing 48 on this proportioning valve a cylinder 6, which is communicated with the discharging port 47, is attached; within the cylinder 6 are mounted a plunger 7, a compression spring 13, and a plug 9, just like in the previous embodiment, for constituting a similar pulsation absorber 10. The above description will naturally clarify the effect and function of this second embodiment without any additional lengthy explanation.

Figure 4:
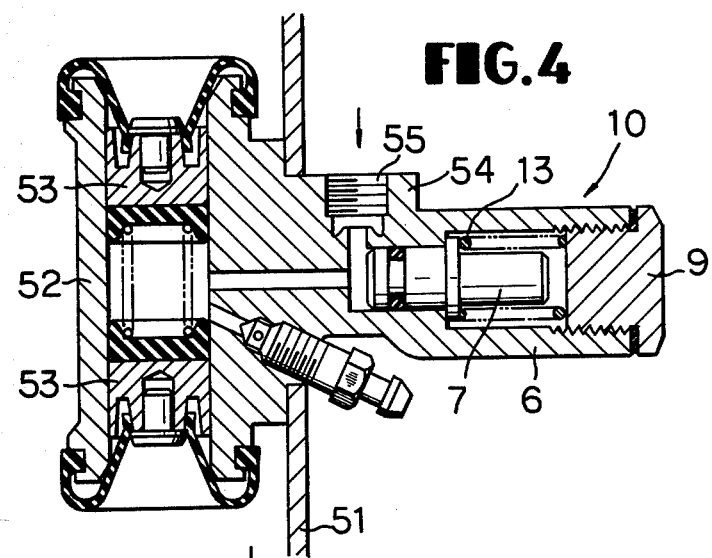
FIG. 4 is an elevational cross-section of a third embodiment in which the vibration absorbing means is disposed in combination with wheel cylinders of a drum brake.

This invention is also applicable on the wheel cylinder of a drum brake; as a third embodiment of the invention it is shown in FIG. 4. A wheel cylinder 52 is secured on a backing plate 51, and in the former a pair of reciprocable pistons 53 are mounted for urging, under the pressure of the fluid from the master cylinder, the brake shoes onto the brake drum. This wheel cylinder 52 is provided with an extension 54, which is connected to the backing plate 51 for accommodating a port 55 for intaking the fluid, and a cylinder 6, which cylinder is composed of a plunger 7, a compression spring 13, and a plug 9 for constituting as a whole a pulsation absorber 10. The third embodiment is similarly effective to the previous two in general; the concept of directly imparing the very wheel cylinder 52, where the vibration is generated, the function of pulsation absorbing, makes the effect of this invention more ensured.

Figure 5:
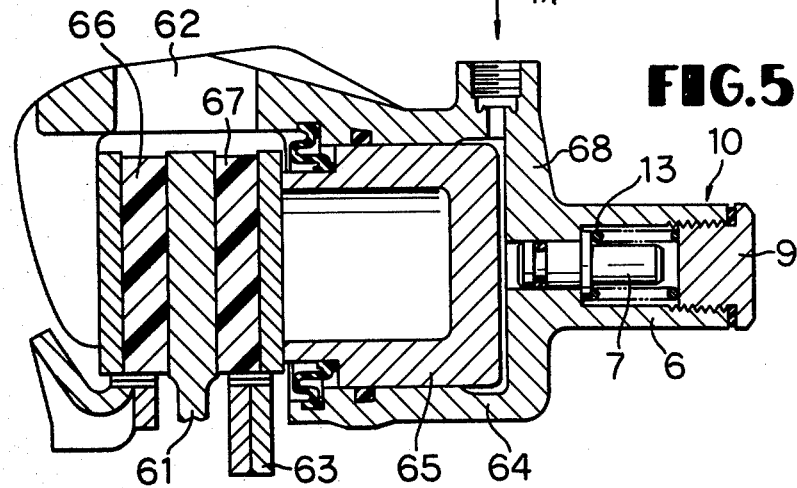
FIG. 5 is an elevational cross-section of a fourth embodiment in which the vibration absorbing means is disposed in the bottom wall of a wheel cylinder on a disc brake.

FIG. 5, a fourth embodiment, is an example wherein a pulsation absorber 10 is applied on the wheel cylinder of a disc brake. A caliper 62 is, with a mounting bracket 63, movably retained in a perpendicular direction to the surface of a disc rotor 61 at a straddling posture on the outer peripheral portion thereof, on one end of the caliper 62 being integrally disposed a wheel cylinder 64. A piston 65 urges a braking pad 67 (and braking pad 66 indirectly by reaction force) for applying braking force onto a disc rotor 61. On the bottom wall 68 of the wheel cylinder 64 is integrally formed a cylinder 6, which constitutes a pulsation absorber 10 as a whole including similarly a plunger 7, a compression spring 13, and a plug 9. This embodiment enjoys the same effects and advantages as the third embodiment in which the wheel cylinder 52 in the drum brake works as a pulsation absorber.

Figure 6:
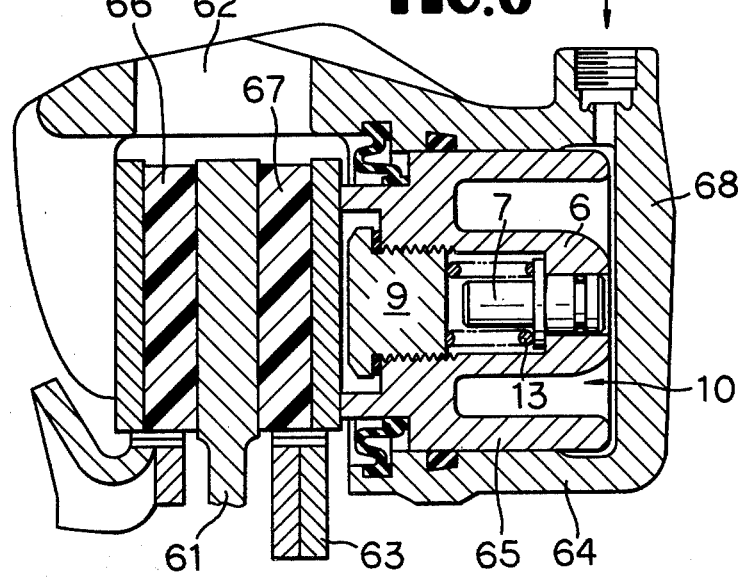
FIG. 6 is an elevational cross-section of a fifth embodiment in which the vibration absorbing means is disposed in combination with a piston in a wheel cylinder of a disc brake.

As a fifth embodiment, an example in which the invention is applied to the piston in a disc brake is illustrated in FIG. 6. A pulsation absorber 10 is disposed within a piston 65 in a disc brake, which is identical in construction to the previous one, so being alotted the same numerals for omitting the description. A cup-shaped piston 65 is fitted in the wheel cylinder 64, with the opening thereof facing the bottom wall 68 of the wheel cylinder 64; in the central portion thereof a cylinder 6 is being integrally formed, which cylinder includes a plunger 7, a compression spring 13, and a plug 9. In this case, the plunger 7 needs no piping or joint for supplying the fluid. In addition to the extremely remarkable effect of pulsation absorbing because of its installation in the very source of vibration, this embodiment enjoys all the advantages that the forerunners possess.

It will be obvious to those skilled in the art that various changes may be made without departing from the scope of the invention and the invention is not to be considered limited to what is shown in the drawings and described in the specification.

What is claimed is:

1. An anti-vibration means for an automotive hydraulic disc brake comprising:
   a cylinder portion formed in communication with a hydraulic braking fluid circuit;
   a plunger slidably and fluid-tightly fitted in said cylinder portion, one end of said plunger being under the pressure of said hydraulic braking fluid and the other end of said plunger facing an air chamber;

restricting means for restricting the axial sliding of said plunger within a limited range; and spring means for constantly biasing said plunger in a direction to resist the braking fluid pressure, wherein said cylinder portion is accommodated in a cup-shaped piston and integrally formed on the bottom wall of said piston, said piston being slidably fitted in a wheel cylinder of a disc brake, and the resilient force of said spring means is determined smaller than the force acting on said plunger through said braking fluid pressure in the high pressure range wherein no brake vibration occurs.

2. The anti-vibration means for an automotive hydraulic disc brake claimed in claim 1 wherein said cylinder portion is provided with a stepped bore having a small diametered portion and a large diametered portion, said small diametered portion being open to a pressure chamber of said wheel cylinder and said large diametered portion being closed by a plug, said plug being threaded in said large diametered portion and facing said plunger with a predetermined distance kept therebetween, and further said plunger is fluid-tightly fitted in said small diametered portion and is provided with a flange portion facing a shoulder surface of said stepped bore, said shoulder surface and said plug forming said restricting means.

3. The anti-vibration means for an automotive hydraulic disc brake claimed in claim 2 wherein said spring means is a compression spring mounted between said plug and said flange portion of said plunger.

* * * * *